(12) United States Patent
Oomori

(10) Patent No.: US 8,815,459 B2
(45) Date of Patent: Aug. 26, 2014

(54) FUEL CELL STACK WITH STOICHIOMETRY DETERMINATION IN INDIVIDUAL CELLS

(75) Inventor: Hideyo Oomori, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 912 days.

(21) Appl. No.: 12/160,529

(22) PCT Filed: Jan. 5, 2007

(86) PCT No.: PCT/IB2007/000024
§ 371 (c)(1),
(2), (4) Date: Jul. 10, 2008

(87) PCT Pub. No.: WO2007/080468
PCT Pub. Date: Jul. 19, 2007

(65) Prior Publication Data
US 2010/0159340 A1 Jun. 24, 2010

(30) Foreign Application Priority Data

Jan. 10, 2006 (JP) .................................. 2006-002739

(51) Int. Cl.
H01M 8/04 (2006.01)

(52) U.S. Cl.
CPC ........ H01M 8/0488 (2013.01); H01M 8/04865 (2013.01); H01M 8/04753 (2013.01)
USPC ............................ 429/432; 429/430; 429/428

(58) Field of Classification Search
USPC .......................................... 429/428, 430, 432
See application file for complete search history.

(56) References Cited

U.S. PATENT DOCUMENTS

| 6,162,557 A * | 12/2000 | Kraaij ........................... 429/432 |
| 6,461,751 B1 * | 10/2002 | Boehm et al. .................. 429/432 |
| 6,905,791 B2 * | 6/2005 | Busenbender ................ 429/429 |
| 2004/0033399 A1 * | 2/2004 | Imamura et al. ................ 429/23 |

FOREIGN PATENT DOCUMENTS

| DE | 10 2004 005 530 A1 | 9/2004 |
| EP | 1 575 113 | 9/2005 |
| JP | 8 315843 | 11/1996 |
| JP | 2003 346849 | 12/2003 |
| JP | 2005 71626 | 3/2005 |
| JP | 2006 032098 | 2/2006 |
| WO | 97 42674 | 11/1997 |
| WO | 2005 031901 | 4/2005 |
| WO | WO 2005/053075 A1 | 6/2005 |

OTHER PUBLICATIONS

Jan. 26, 2012 English Translation of German Office Action (DE 11 2007 000 141.0).

* cited by examiner

*Primary Examiner* — Ula C Ruddock
*Assistant Examiner* — Scott J Chmielecki
(74) *Attorney, Agent, or Firm* — Oblon, Spivak, McClelland, Maier & Neustadt, L.L.P.

(57) ABSTRACT

A fuel system including a fuel cell including a plurality of unit cells supplied with a prescribed gas to generate electricity, a stoichiometric ratio calculating apparatus calculating the stoichiometric ratio of the prescribed gas for each unit cell, and a gas flow increasing apparatus increasing the supply of the prescribed gas when the stoichiometric ratio falls below a prescribed value.

7 Claims, 9 Drawing Sheets

FUEL CELL STACK WITH STOICHIOMETRY DETERMINATION IN INDIVIDUAL CELLS

FIELD OF THE INVENTION

The present invention relates to a fuel cell system, a method of operating a fuel cell system, and a cell stoichiometric calculation apparatus used in a fuel cell system.

BACKGROUND OF THE INVENTION

Japanese Patent Application Publication No. JP-A-8-315843 discloses a fuel cell in which gas is supplied to the anode side until the voltage exceeds a prescribed value, and in which supply of electrical power to an external load is started after removing stagnated water.

In the above-noted art, however, because blockage of the anode flow passage is the only cause that is considered for the voltage being below a prescribed value, there are cases in which, for other causes, startup takes time.

When starting up at below the freezing point, there are cases in which the water generated the previous time of operation freezes within the fuel cell and blocks the gas passage within the fuel cell. In this case, because the flow of gas is hindered, the voltage of the fuel cell drops, making it difficult to achieve stable fuel cell operation. For this reason, warm-up requires a long period of time, making it difficult to transition to normal operation quickly.

Even if an attempt is made to determine whether or not there is freezing in the gas flow passage at low temperatures, if there is blockage of the flow passage in only several cells, there is almost no influence on the gas pressure loss. For this reason, it is difficult to determine whether the flow passage is blocked.

If blockage of the flow passage causes further insufficiency in gas supply, there is the problem of generation of a negative voltage. In this case, it is difficult to judge whether the cause of the negative voltage is insufficient supply of anode gas or insufficient supply of cathode gas. In particular in the case in which there is insufficient supply of anode gas, there is the problem of deterioration of the electrolyte membrane, the catalyst layer, or the like by the negative voltage.

DISCLOSURE OF THE INVENTION

The present invention has an object the provision of stable warm-up operation of a fuel cell while inhibiting deterioration of the fuel cell caused by insufficient gas supply when starting the fuel cell.

The first aspect of the present invention relates to a fuel cell system. The fuel cell system includes a fuel cell including a plurality of unit cells supplied with a prescribed gas to generate electricity, means for calculating a cell stoichiometric ratio of the prescribed gas for each unit cell when the fuel cell is started, and means for increasing a gas amount of the prescribed gas that is supplied when the cell stoichiometric ratio decreases below a prescribed value.

The fuel cell system may be used when the fuel cell starts at the low temperature. Specifically, the system may include a fuel cell having a plurality of unit cells supplied with a prescribed gas to generate electricity, means for calculating a cell stoichiometric ratio of the prescribed gas for each unit cell when the fuel cell is started at a low temperature, and means for increasing a gas amount of the prescribed gas that is supplied when the cell stoichiometric ratio decreases below a prescribed value.

In the fuel cell system, the cell stoichiometric ratio calculation means includes means for acquiring a cell voltage of each unit cell, means for calculating an average cell voltage by averaging the cell voltages of each unit cell, means for varying the stoichiometric ratio of the prescribed gas that is supplied to the fuel cell varied from a reference value, means for acquiring an approximating equation representing a relationship between the stoichiometric ratio and the rate of change of the average cell voltage when the stoichiometric ratio is varied from the reference value, and means for calculating the rate of change of the cell voltage of each unit cell when the stoichiometric ratio is varied from the reference value to a prescribed value. The cell stoichiometric ratio calculating means may calculate the cell stoichiometric ratio for each unit cell based on the rate of change of the cell voltage, using the approximating equation.

The fuel cell system may further include means for calculating a flow rate of the prescribed gas for each unit cell based on the cell stoichiometric ratio calculated for each unit cell.

The means for increasing a gas amount may include means for calculating a minimum value of the cell stoichiometric ratio of the prescribed gas or the flow rate of the prescribed gas, which is calculated in each unit cell, and means for controlling the flow rate of the prescribed gas that is supplied to the fuel cell so that the minimum value is not less than the prescribed threshold.

The fuel cell system may further include means for acquiring an internal temperature of the fuel cell and means for correcting the cell voltage based on the internal temperature.

The means for acquiring an internal temperature may acquire the internal temperature based on the cooling water temperature which circulates around the fuel cell.

The means for acquiring an internal temperature acquires the internal temperature based on energy generated from the starting time of the fuel cell and an electric power generation amount of the fuel cell.

When the cell stoichiometric ratio is calculated, means for setting a load in which the load of the fuel cell is set as a smaller value than that of the load at the time of the normal operation, may further included in the aspect.

The means for increasing the amount of the gas, after operation of the fuel cell transitions to normal operation, may be increased by the ratio of increase before transitioning to the normal operation until the temperature of the fuel cell exceeds the freezing point.

The means for increasing the amount of the gas may be reduced after the temperature of the fuel cell rises to above the freezing point.

The prescribed gas is the first gas containing hydrogen and the second gas containing oxygen, and the means for calculating a cell stoichiometric ratio calculates the cell stoichiometric ratio of the second gas for each unit cell after calculating the cell stoichiometric ratio of the first gas for each unit cell.

The second aspect of the present invention relates to a method of operating a fuel cell system. The method includes calculating a cell stoichiometric ratio of the prescribed gas for each unit cell when the fuel cell that includes a plurality of unit cells supplied with a prescribed gas to generate electricity is started, and increasing a gas amount of the prescribed gas that is supplied when the cell stoichiometric ratio decreases below a prescribed value.

The method of operating a fuel cell system may also use the time of period of which the fuel cell starts at the low temperature. Specifically, the method may includes calculating a cell stoichiometric ratio of the prescribed gas for each unit cell when the fuel cell that includes a plurality of unit cells supplied with a prescribed gas to generate electricity is started at a low temperature, and increasing a gas amount of the prescribed gas that is supplied when the cell stoichiometric ratio decreases below a prescribed value.

The third aspect of the present invention relates to an apparatus calculating a cell stoichiometric ratio used for a fuel cell system. The apparatus includes means for acquiring a cell voltage of unit cells of a fuel cell that has a plurality of unit cells and that is supplied with a prescribed gas to generate electronic power, means for calculating the average cell voltage by averaging the cell voltages of each unit cell, means for varying the stoichiometric ratio of the prescribed gas that is supplied to the fuel cell varied from on a reference value, means for acquiring an approximating equation representing a relationship between the stoichiometric ratio and the rate of change of the average cell voltage when the stoichiometric ratio is varied from the reference value, and means for calculating the rate of change of the cell voltage of each unit cell when the stoichiometric ratio is varied from the reference value to a prescribed value. The cell stoichiometric ratio calculating means calculates the cell stoichiometric ratio for each unit cell based on the rate of change of the cell voltage, using the approximating equation.

The apparatus calculating a cell stoichiometric ratio may further include means for acquiring an internal temperature of the fuel cell and means for correcting the cell voltage based on the internal temperature.

The apparatus calculating a cell stoichiometric ratio may further include means for setting a load of the fuel cell to a value that is smaller than that of the load at the time of the normal operation.

The apparatus calculating a cell stoichiometric may further includes first means for calculating a the cell stoichiometric ratio of the first gas of the prescribed gas that includes, for each unit cell, and second means for calculating a the cell stoichiometric ratio of the second gas of the prescribed gas that includes oxygen, for each unit cell.

Because the first aspect of the present invention increases the amount of prescribed gas that is supplied in the case in which the cell stoichiometric ratio calculated for each unit cell is below a prescribed value even if the gas fuel passage is blocked due to freezing, it suppresses a decrease in the voltage of the fuel cell and enables stable operation of the fuel cell. The first aspect also shortens the time required for warm-up of the fuel cell, and can suppress deterioration of the fuel cell due insufficient supply of gas.

It is possible to determine the cell stoichiometric ratio of the prescribed gas for each unit cell, based on an approximating equation representing the relationship between the stoichiometric ratio of the prescribed gas supplied to the fuel cell and rate of change of the average cell voltage. It is therefore possible to detect what unit cells have blocked flow passages based on the cell stoichiometric ratio, and possible to increase the amount of prescribed gas supplied based on the stoichiometric ratio.

Because it is possible to calculate the flow amount of the prescribed gas for each unit cell based on the stoichiometric ratio calculated for each unit cell, it is possible to detect which unit cells have flow passages block by freezing, and possible to increase the amount of prescribed gas that is supplied, based on the amount of flow of prescribed gas for each unit cell.

Because control is done of the flow amount of the prescribed gas supplied to the fuel cell so that the minimum value of the flow amount or the stoichiometric ratio of the prescribed gas is above a prescribed threshold value, it is possible to reliably suppress a decrease in the output of each unit cell. It is therefore possible to operate the fuel cell stably when starting at a low temperature.

Because the cell voltage is corrected based on the internal temperature of the fuel cell, it is possible to suppress the influence of a temperature rise in the fuel cell on the cell voltage when starting at a low temperature. It is therefore possible to determine the cell stoichiometric ratio with high accuracy.

Because the load on the fuel cell is set to a value that is smaller than the load for normal operation when the cell stoichiometric ratio is calculated, it is possible to suppress film deterioration due to a negative voltage, even if there is an insufficient supply of gas to a part of the cell.

After operation of the fuel cell transitions to normal operation, because the amount of prescribed gas supplied is increased by the ratio of increase before transitioning to normal operation until the temperature of the fuel cell exceeds the freezing point, even after transitioning to normal operation it is possible to increase the cell stoichiometric ratio of unit cells having flow passage blockage due to freezing, so that it is possible to suppress a decrease in the voltage of the fuel cell.

Because the increasing of the amount of prescribed gas supplied is stopped after the temperature of the fuel cell rises to above the freezing point, it is possible to operate the fuel cell with the minimum amount of gas responsive to the operation conditions.

Because an insufficiency in supply of the first gas including hydrogen occurs when there is a large degree of flow path blockage, by first calculating the stoichiometric ratio of the first gas and increasing the amount of flow of the first gas, it is possible to warm up the first gas flow passages, thereby enabling a shortening of the warm-up time. Also, when the supply of the first gas is insufficient, because of deterioration of the fuel cell due to a negative voltage, by first calculating the cell stoichiometric ratio of the first gas, it is possible to quickly distinguish an insufficiency in supply of the first gas. It is therefore possible to suppress deterioration of the fuel cell due to a negative voltage.

BRIEF DESCRIPTION OF THE DRAWINGS

The foregoing and further objects, features, and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
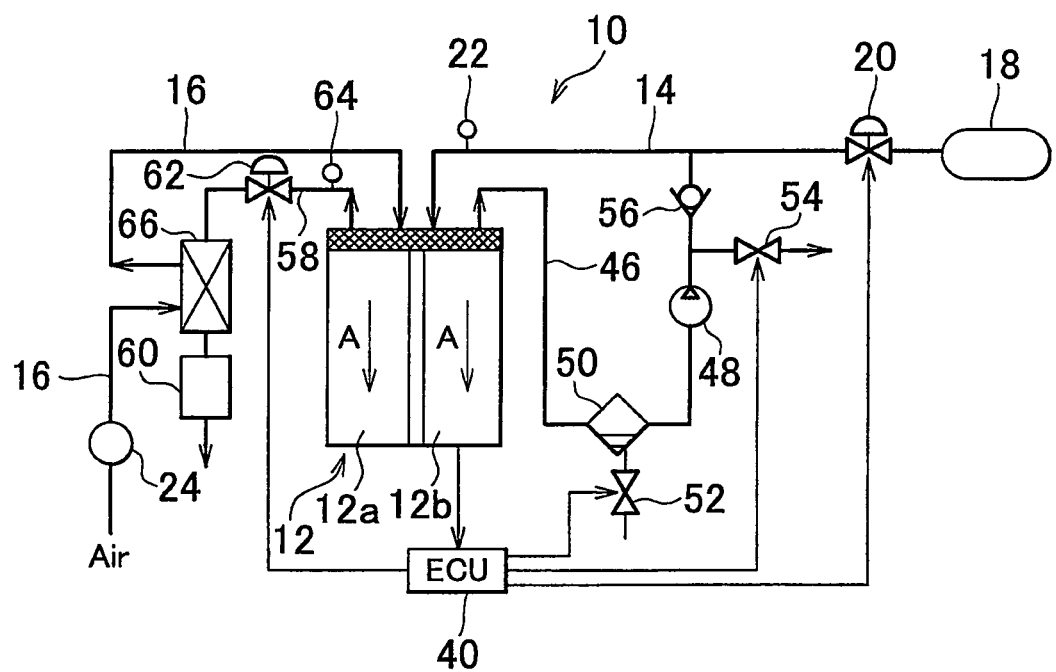
FIG. 1 is a schematic representation showing the configuration of a fuel cell system according to an embodiment of the present invention.

Embodiments of the present invention are described below with reference to accompanying drawings. Common elements in each drawing are assigned the same reference numerals and are not repeatedly described herein. It will be understood that the following description of the embodiments does not restrict the invention.

The configuration of a fuel cell system according to an embodiment of the present invention is now described. FIG. 1 is a schematic representation showing the configuration of a fuel cell system 10 according to this embodiment. Fuel cell system 10 is installed, for example, in a fuel cell vehicle. Fuel cell system 10 has a fuel cell 12. In this embodiment, the fuel cell (FC) 12 is a fuel cell (PEMFC) having a solid polymer separating membrane, and is formed from two fuel cell stacks (stack 12a and stack 12b).

Each of the stacks 12a and 12b is formed by a plurality of laminated unit cells that are formed by anodes, cathodes, and separators. In FIG. 1 and FIG. 2, arrow A indicates the lamination direction of the unit cells. In this embodiment, each of the stacks 12a and 12b is formed by 200 unit cells.

The electrolyte membrane provided in the unit cells is a proton-conductive ion exchange membrane formed, for example, by a fluorine-based solid polymer material. The anode and cathode are formed by carbon cloth made of carbon fiber, and have a catalyst layer and a diffusion layer. The separator is formed by a electrically conductive material that is non-permeable to gas, formed by compressing carbon to form a dense carbon that is not gas-permeable. Neighboring unit cells are laminated so that the anode of one cell faces the cathode of another cell with an intervening separator.

As shown in FIG. 1, the anode gas flow passage 14 and cathode gas flow passage 16 lead into the fuel cell 12. The anode gas flow passage 14 is connected to a high-pressure hydrogen tank 18, and hydrogen-rich anode gas is sent from the hydrogen tank 18 to the anodes of each of the stacks 12a and 12b. The anode gas flow passage 14 is provided with a regulator 20 downstream from the hydrogen tank 18. The regulator 20 regulates the pressure of anode gas at the intake of the fuel cell 12 to an appropriate pressure that is demanded. A pressure sensor 22 is connected to the anode gas flow passage 14 downstream from the regulator 20.

A pump 24 is provided in the cathode gas flow passage 16, the pump 24 being driven so as to send cathode gas which contains oxygen to the cathodes within each of the stacks 12a and 12b as oxidizing gas.

Figure 2A:
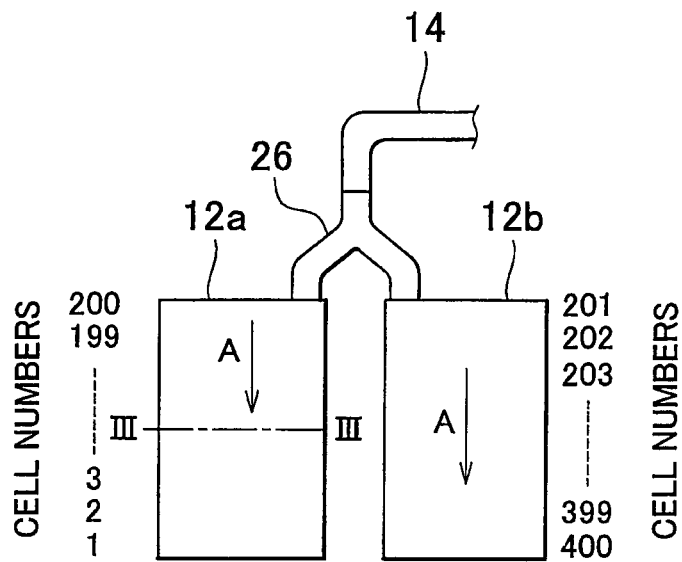
FIGS. 2A and 2B are schematic representations showing the details of the anode gas passage, the cathode gas passage, and the connecting parts to each stack.
Figure 2B:
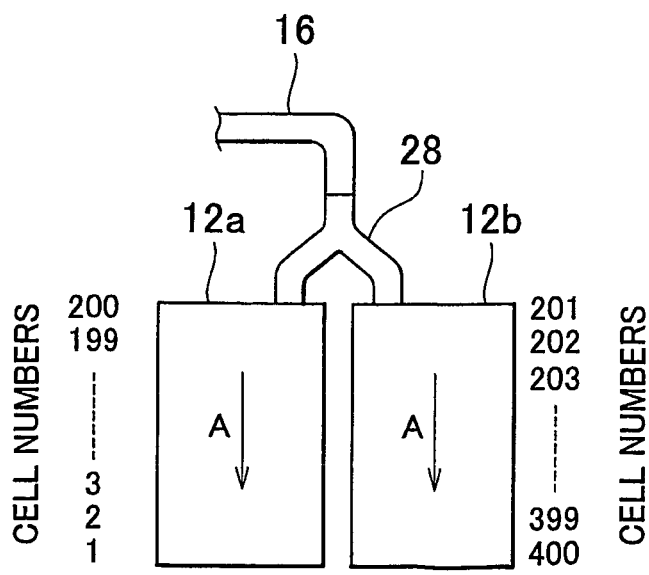

FIGS. 2A and 2B are schematic representations showing the details of the connecting parts between the cathode gas flow passage 16 and each of the stacks 12a and 12b, respectively. In this case, FIG. 2A shows the connecting part between the anode gas flow passage 14 and stacks 12a and 12b. As shown in FIG. 2A, the anode gas flow passage 14 is connected to each of the stacks 12a and 12b via the dividing pipe 26. The dividing pipe 26 has the function of dividing the anode gas sent from the anode gas flow passage 14 to the stack 12a and the stack 12b.

FIG. 2B shows the connecting part between the cathode gas flow passage 16 and stacks 12a and 12b. As shown in FIG. 2B, the cathode gas flow passage 16 is connected to stacks 12a and 12b via the dividing pipe 28. The dividing pipe 28 has the function of dividing cathode gas sent from the cathode gas flow passage 16 to stack 12a and stack 12b.

FIGS. 2A and 2B show the positions of the 400 unit cells of the stacks 12a and 12b. As shown in FIGS. 2A and 2B, cells having cell numbers #1, #200 are provided in the stack 12a and cells having cell numbers #201 to #400 are provided in the stack 12b. In stack 12a, cell number #1 is disposed at the side that is opposite the end at which the dividing pipes 26, 28 are connected, the cell numbers increasing toward the dividing pipes 26, 28, the number of the cell closest to the dividing pipes 26, 28 being #200. In contrast, in stack 12b, the cell having the cell number #201 is disposed at the side at which the dividing pipes 26, 28 are connected, and the cell numbers increase moving away from the dividing pipes 26, 28, the cell number #400 being the most distant from the dividing pipes 26, 28.

Figure 3:
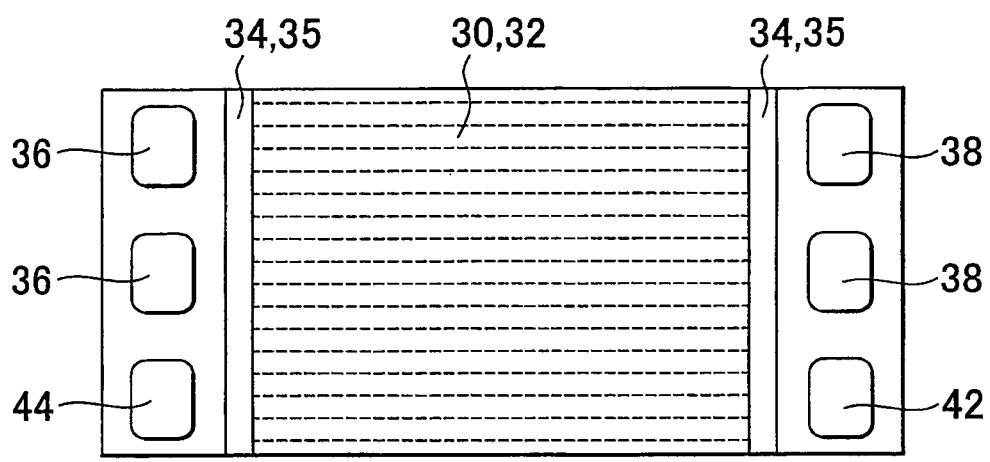
FIG. 3 is a schematic representation showing in plan view form the configuration of each unit cell and the surrounding area.

FIG. 3 is a schematic representation showing in plan view form the area surrounding each unit cell, in which the inside of each of the stacks 12a and 12b is viewed from the direction of lamination of the unit cells. That is, FIG. 3 shows in schematic form the cross-section in a direction that intersects the lamination direction of the cells, for example corresponding to the cross-section along the dot-dash line III-III shown in FIG. 2A.

As shown in FIG. 3, each of the unit cells is provided with an anode gas flow passage 30 and a cathode gas flow passage 32. Because the flow passages 30, 32 are provided so as to overlap in the lamination direction of the unit cells, in FIG. 3 the flow passages 30, 32 are shown simply as broken lines. As shown in FIG. 3, the flow passages 30, 32 extend in a straight line from one end to the other end of the cells.

On each end of the flow passages 30, 32, the dividing sections 34, 35, which are separately connected to each of the flow passages 30, 32, are provided so as to overlap in the lamination direction of the unit cells. The manifolds 36, 38, 42, 44 are provided further to the outside of the dividing sections 34, 35. Manifold 36 is connected to the anode gas flow passage 30, via the dividing section 34. Manifold 38 is connected to the cathode gas flow passage 32, via the dividing section 35. The manifolds 36, 38 and manifolds 42, 44, to be described below, are provided as holes that pass through in the cell lamination direction. The end part of the manifold 36 is connected to the dividing pipe 26, and the end part of the manifold 38 is connected to the dividing pipe 28.

Coolant circulates each of the unit cells of the fuel cell 12. By doing this, excessive rise in temperature of the fuel cell 12 accompanying electrical generation is inhibited, and the temperature of the fuel cell 12 is appropriately set.

By adopting this configuration, anode gas that is sent from the anode gas flow passage 14 to each of the stacks 12a and 12b via the dividing pipe 26 is sent to the manifold 36 and sent to each of the unit cell anodes from the manifold 36 via the dividing section 34 and flow passage 30. In the same manner, cathode gas sent to each of the stacks 12a, 12b via the dividing pipe 28 from the cathode gas flow passage 16 is sent to the manifold 38 and from the manifold 38 to the cathodes of each unit cell via the dividing section 35 and the flow passage 32.

When anode gas is sent to the anodes of the fuel cell 12, hydrogen ions are generated from the hydrogen contained in the anode gas ($H_2 \rightarrow 2H^+ + 2e^-$). When cathode gas is sent into the cathodes of the fuel cell 12, oxygen ions are generated from the oxygen contained in the cathode gas. In this manner, electrical power is generated within the fuel cell 12. Simultaneously with this, water is produced at the cathode from the above-noted hydrogen ions and oxygen ions (($1/2$)$O_2$+2H$^+$+ 2e$^-$→$H_2O$). Almost all of this water absorbs heat generated within the fuel cell 12 and is vaporized and discharged as part of the cathode off-gas.

Anode off-gas discharged from the anodes is sent to the manifold 42 shown in FIG. 3, and is sent to the off-gas flow passage 46 shown in FIG. 1, via the manifold 42. A pump 48 is provided in the anode off-gas flow passage 46, and the anode off-gas is returned again to the anode gas flow passage 14 by driving the pump 48. Anode off-gas that has been returned to the anode gas flow passage 14 is supplemented by hydrogen from the hydrogen tank 18, and is sent once again to the fuel cell 12. By sending anode off-gas to the fuel cell 12, it is possible to cause a reaction within the fuel cell with non-reacted hydrogen contained in the anode off-gas, thereby enabling an improvement in the efficiency of utilization of the hydrogen. The amount of flow of cathode gas sent to the fuel cell 12 can be controlled by the regulator 20 and the pump 48.

A gas/fluid separator 50 that collects water content from the anode off-gas is provided in the anode off-gas flow passage 46. A water drain valve 52 is connected to the gas/fluid separator 50. The water content of the anode off-gas collected by the gas/fluid separator 50 is discharged by opening the water drain valve 52.

An exhaust valve 54 is connected to the anode off-gas flow passage 46 downstream from the pump 48. If a large amount of impurity components such as nitrogen (N2) or the like is included in the anode circulating system formed by the path from the anode off-gas flow passage 46 to the anode gas flow passage 14 and then the fuel cell 12, purging is performed by intermittently opening the exhaust valve 54 to exhaust such components.

A check valve 56 is provided downstream at the location of the connection of the exhaust valve 54. The check valve 56 has the function of blocking the flow from the anode gas flow passage 14 toward the pump 48.

Off-gas that is exhausted from the cathodes of each unit cell is sent to the manifold 44 shown in FIG. 3, and sent from the manifold 44 to the cathode off-gas flow passage 58 shown in FIG. 1. The cathode off-gas passes through the cathode off-gas flow passage 58 and is ultimately discharged from the muffler 60. A control valve 62 that adjusts the pressure of the cathode off-gas and a pressure sensor 64 that detects the cathode off-gas pressure upstream from the control valve 62 are provided in the cathode off-gas flow passage 58. The control valve 62 enables control of the pressure of the cathode off-gas discharged from the fuel cell 12. The amount of flow of cathode gas sent to the fuel cell 12 can be controlled by the pump 24 and the control valve 62.

A humidifier 66 is provided upstream from the muffler 60 in the cathode off-gas flow passage 58. The cathode gas flow passage 16 leads into the humidifier 66. The humidifier 66 has the function of absorbing water content contained in the cathode off-gas generated within the fuel cell 12 and humidifying the cathode gas within the cathode gas flow passage 16 by means of the absorbed water content.

As shown in FIG. 1, the system of this embodiment has an ECU (electronic control unit) 40. Various sensors (not illustrated) for the purpose of detecting the output (voltage value and current value) of the fuel cell 12 and cooling water temperature and the like are connected to the ECU 40 in order to achieve a grasp of the operating condition of the system. By means of these sensors, it is possible for the ECU 40 to detect the individual cell voltages of each of the 400 unit cells of the fuel cell 12. The above-described pressure sensors 22, 64, the regulator 20, the water drain valve 52, the exhaust valve 54, and the control valve 62 and the like are connected to the ECU 40. By controlling the output of the fuel cell 12, the various gas pressures, and the various gas flow amounts, the ECU 40 can operate the fuel cell 12 in the desired operating condition.

The method of calculating the stoichiometric ratio (gas flow amount) of each unit cell will now be described. The fuel cell 12 generates electricity by means of a reaction within each unit cell between hydrogen in the anode gas and oxygen in the cathode gas as described above. Therefore, in order to improve the electrical generation efficiency of the fuel cell 12, it is necessary to accurately control the amount of gas supplied to each unit cell. However, when starting up at extremely low temperatures, there are cases in which freezing can occur in the anode gas and cathode gas flow passages 30, 32, the dividing sections 34, 35, and the manifolds 36, 38, 42, 44 and the like. When freezing causes blockage of the flow passages 32, 34, the flow of gas within the flow passage can be inhibited.

For this reason, in this embodiment, the stoichiometric ratio (gas amount) supplied to each of the unit cells is determined when the fuel cell 12 is started at a low temperature, and if the supply of gas is insufficient, processing is performed to increase the gas supply amount.

In detecting the amount of gas supplied to each unit cell, one method that can be envisioned is that of predicting the amount of supplied gas based on the cell voltage of each unit cell. However, because the cell voltage varies in accordance with factors other than the amount of gas, there are difficulties in accurately predicting the amount of gas supplied to each cell based on the cell voltage.

For example, in a given unit cell, if something has caused deterioration of the electrolyte membrane or of the catalyst layer and diffusion layer that form the anode and cathode, even if the amount of gas supplied to that unit cell is maintained at the adequate value, the cell voltage decreases. If impurities have become attached to the flow passages 30, 32 or the like of the anode and cathode, the cell voltage decreases even if the amount of gas supplied is the adequate value.

It is therefore difficult by a decision based on cell voltage to separate variations in cell voltage caused by the amount of gas supplied and variation in cell voltage caused by other factors, making it difficult to accurately detect the amount of gas supplied to each unit cell based on the cell voltage.

Given the above, this embodiment calculates the amount of gas supplied to each unit cell based on the rate of change of the cell voltage of each unit cell. The method of determining the amount of gas supplied to each unit cell based on the rate of change of cell voltage is described in detail below. In this description, the method is that of determining the amount of cathode gas supplied to each of the unit cells, although it is alternatively possible to make this determination by a similar method with regard to the anode gas supply amount.

Figure 4:
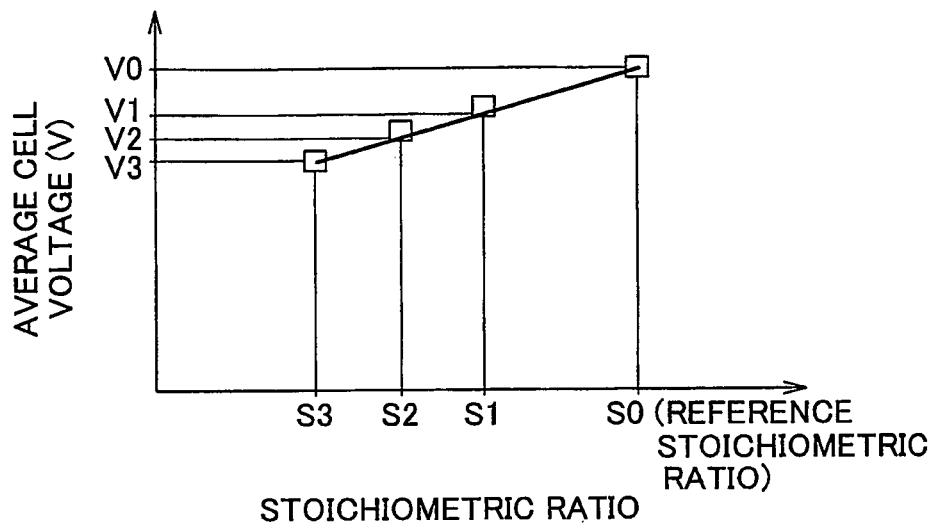
FIG. 4 shows the characteristics indicating the relationship between the amount of flow of cathode gas supplied to a fuel cell and the output of the fuel cell.

FIG. 4 shows the characteristics indicating the relationship between the stoichiometric ratio of cathode gas supplied to the fuel cell 12 and the output of the fuel cell 12, these characteristics being acquired by actual measurements during operation of the fuel cell 12.

In FIG. 4, the horizontal access indicates the stoichiometric ratio of the cathode gas flowing in the cathode gas flow passage 16. This stoichiometric ratio is the ratio of actual cathode gas flow amount with respect to the theoretical value of cathode gas flow amount. The theoretical value of cathode gas flow amount is a value that is calculated based on the drive load of the fuel cell 12. The stoichiometric ratio of the cathode gas in the high current density region is normally approximately 1.2 to 1.5, and by making the actual cathode gas flow amount larger than the theoretical value, it is possible to operate the fuel cell 12 stably.

The vertical access in FIG. 4 represents the average value of cell voltage (average cell voltage) of all the unit cells of the fuel cell 12. As described above, the ECU 40 can detect the cell voltage of each of the unit cells, and by taking the average of these cell voltages, can determine the average cell voltage.

In obtaining the characteristics shown in FIG. 4, the amount of anode gas flow in the anode gas flow passage 14 is held at a constant value. When obtaining the characteristics shown in FIG. 4, the average cell voltage (reference voltage V0) is first detected in a condition in which the stoichiometric ratio is set to the reference stoichiometric ratio S0. After that, the stoichiometric ratio is reduced from the reference stoichiometric ratio S0 and the average cell voltage is detected at the various stoichiometric ratios S1, S2, and S3.

As the stoichiometric ratio is reduced from the reference stoichiometric ratio S0, the amount of cathode gas flow decreases, and because the reaction amount within the fuel cell 12 decreases, the average cell voltage decreases from the reference voltage V0. As shown in FIG. 4, if the stoichiometric ratio is reduced from S0 to S1, the average cell voltage becomes V1, and the amount of variation $\Delta V1$ of the average cell voltage from the reference voltage V0 is (V0−V1). In the same manner, when the stoichiometric ratio is decreased to S2 from S0, the average cell voltage becomes V2, and the amount of variation of the average cell voltage $\Delta V2$ (=V0−V2). When the stoichiometric ratio is reduced to S3 from S0, the average cell voltage becomes V3, and the amount of change in the average cell voltage is $\Delta V3$ (=V0−V3). In this manner, the amount of change in the average cell voltage increases the more the stoichiometric ratio is reduced from the reference stoichiometric ratio S0.

Figure 5:
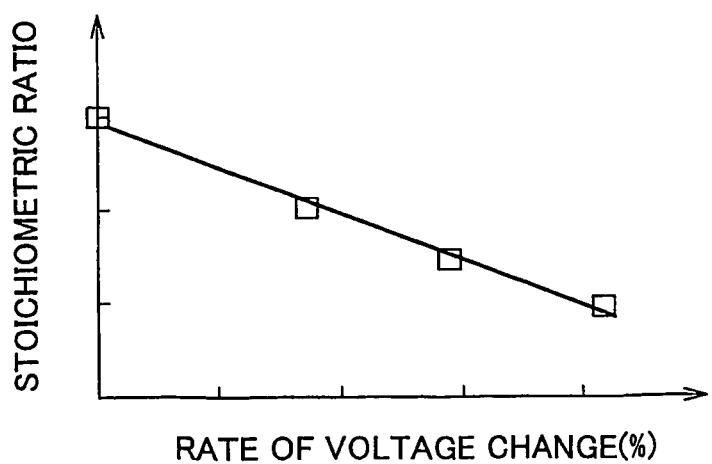
FIG. 5 is a graph showing characteristics indicating the relationship of the rate of change in average voltage of each unit cell and the amount of cathode gas flow.

FIG. 5 shows the characteristics indicating the relationship between the rate of change of the average cell voltage and the stoichiometric ratio (approximation), this being obtained based on the characteristics shown in FIG. 4. In FIG. 5, the horizontal axis represents the rate of change of the average cell voltage. The rate of change of the average cell voltage (for example, at each of the stoichiometric ratios S1, S2, and S3 in FIG. 4) can be determined by dividing the amounts of change $\Delta V1$, $\Delta V2$, and $\Delta V3$ of the average cell voltage each by the reference voltage V0. That is, the voltage change rate at the stoichiometric ratio S1 is $\Delta V1/V0$, the voltage change rate at the stoichiometric ratio S2 is $\Delta V2/V0$, and the rate of voltage change at the stoichiometric ratio S3 is $\Delta V3/V0$. The approximating equation used in FIG. 5 is obtained by plotting the voltage change rate at each of the stoichiometric ratios S1, S2, and S3 and joining these by an approximating curve (straight line).

The characteristics shown in FIG. 5 clearly indicate the relationship between the rate of voltage change of the unit cells and the stoichiometric ratio of the cathode gas. Therefore, if the rate of change of cell voltage for each unit cell is determined, it is possible to determine the stoichiometric ratio for each unit cell (stoichiometric ratio of the cathode gas flowing in each unit cell) based on the voltage change rate.

The cell voltage in each of the unit cells changes by varying the stoichiometric ratio of the cathode gas supplied to the fuel cell 12. Therefore, from the amount of change in the cell voltage of each unit cell when the stoichiometric ratio is varied, it is possible to determine the rate of voltage change of the cell voltage.

The method of determining the cell voltage rate of change in each unit cell is described below. In determining the rate of change of the voltage of each unit cell, the stoichiometric ratio of the cathode gas in the cathode gas flow passage 16 is first set to the reference stoichiometric ratio S0 described with regard to FIG. 4, and the reference voltage V0 (n) in each unit cell is determined under this condition. After this, the stoichiometric ratio in the cathode gas flow passage 16 is reduced from the reference stoichiometric ratio S0 to the stoichiometric ratio SA at the time of normal operation. Under the condition with the stoichiometric ratio as SA, the cell voltage VA (n) in each unit cell is determined. By doing this, the amount of change of cell voltage (V0(n)−VA(n)) when the stoichiometric ratio is changed from S0 to SA is determined, and by dividing this change amount (V0(n)−VA(n)) by the reference voltage VA (n), it is possible to determine the rate of change P(n) of the cell voltage of each unit cell. That is, the voltage rate of change P(n) is determined by the following equation.

$$P(n)=(V0(n)-VA(n))/V0(n) \quad (1)$$

In the above, n is the cell number.

The rate of change P(n) of the cell voltage of each unit cell determined in this manner is applied to the characteristics (horizontal access) of FIG. 5. By doing this, it is possible to determine the stoichiometric ratio (cell stoichiometric ratio) of the cathode gas in each unit cell.

As described above, the theoretical value of the cathode gas flow amount required by the fuel cell 12 is calculated based on the load on the fuel cell 12, and based on this the theoretical values of cathode gas flow amounts in each individual unit cell are calculated. Therefore, when the actual cell stoichiometric ratios for each unit cell are determined from the characteristics shown in FIG. 5, by multiplying these by the theoretical cathode gas flow amounts for each unit cell, it is possible to determine the actual cathode gas flow amounts for each unit cell.

Also, assuming supply of a uniform cathode gas to each unit cell, the theoretical value of cathode gas flow amount in each unit cell is the theoretical value of cathode gas supply amount to the entire fuel cell 12 divided by the number of cells.

In this manner, according to the method of this embodiment, it is possible, based on the change ratio of the cell voltage of each unit cell to determine the cell stoichiometric ratio and the cathode gas flow amount for each unit cell. Therefore, it is possible to judge whether or not there is good supply of cathode gas to each individual unit cell.

In the method of this embodiment, the change ratio of the cell voltage is calculated by dividing the voltage change amount from the reference voltage V0 by the reference V0. For this reason, even if there is variation in the cell voltage caused by factors other than the gas supply amount, for example, deterioration of the electrolyte film, diffusion layer or catalyst layer that make up anode and cathode, or shorting or introduction of impurities into the flow passage, there is no influence from this variation. Therefore, according to the method of this embodiment, it is possible to measure the stoichiometric ratio and cathode gas flow amount with good accuracy for each unit cell in a condition that eliminates such factors.

Figure 6:
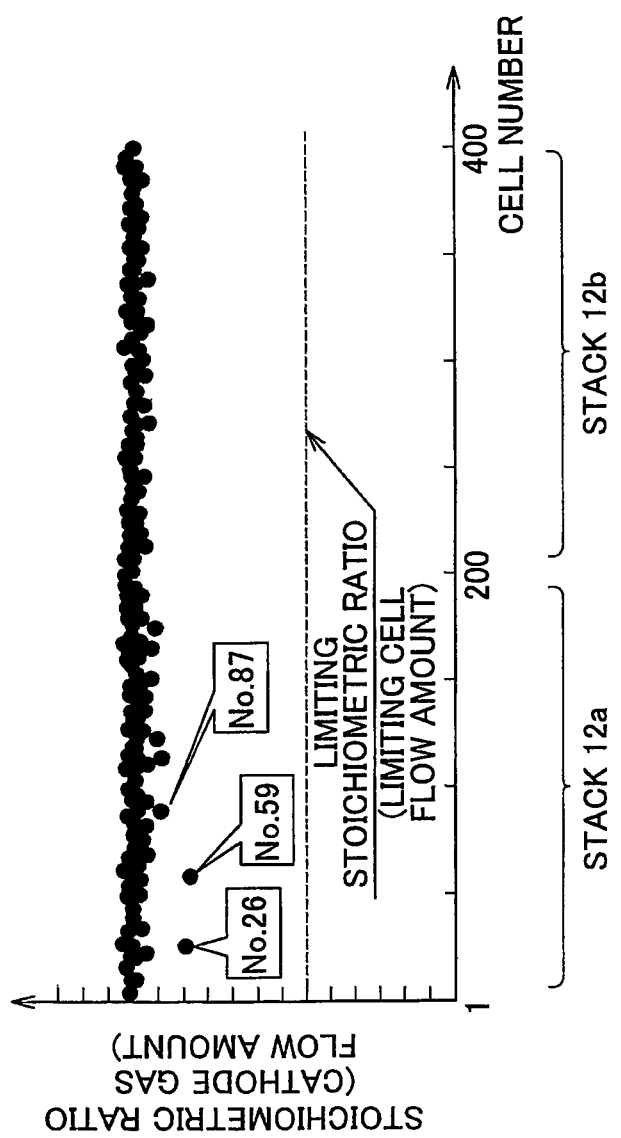
FIG. 6 is a schematic representation showing the results of calculating the amount of cathode gas flow (stoichiometric ratio) in each unit cell (#1 to #400) of a fuel cell.

FIG. 6 is a schematic view showing the results of calculating the stoichiometric ratio (cathode gas flow amount) using the above-described method for each unit cell (#1 to #400) of the fuel cell 12. In FIG. 6, the horizontal axis represents the cell number and the vertical axis represents the cell stoichiometric ratio (cathode gas flow amount).

In the results shown in FIG. 6, the cell stoichiometric ratio (cathode gas flow amount) is substantially uniform for each unit cell (#201 to 400) of the stack 12b. However, for the unit cells (#1 to #200) of the stack 12a, there is a decrease in the stoichiometric ratio (cathode gas flow amount) of cells with relatively small numbers #26, #59, #87 compared with the other cells. Therefore, it is possible to judge that there is a decrease in the amount of gas supplied (stoichiometric ratio) in these cells.

In order to operate the fuel cell 12 stably, it is necessary to perform operation so that the cell stoichiometric ratio (cathode gas flow amount) in each unit cell is above the limiting cell stoichiometric ratio (limiting cell flow amount) shown in FIG. 6. According to the method of this embodiment, because it is possible to determine with high accuracy the cell stoichiometric ratio (gas flow amount) in each unit cell, by supplying gas so that the minimum value of the cell stoichiometric ratio (gas flow amount) for each unit cell is always greater than the limiting cell stoichiometric ratio (limiting cell flow amount), it is possible to operate the fuel cell 12 stably.

Warm-up operation from a low temperature will now be described. When starting up at a low temperature below the freezing point, water content and the like that was generated within the fuel cell 12 at the last time of operation can be presumed to have frozen within the fuel cell 12 in which it remains. In this embodiment, using the above-described method, the cell stoichiometric ratio (gas flow amount) for each unit cell is determined when starting up at a low temperature, and a judgment is made of the unit cells in which the stoichiometric ratio has decreased.

When starting up from a low temperature, in the unit cells in which the cell stoichiometric ratio has decreased, it is possible to assume that the freezing has caused blockage of the flow passages 30, 32. In this case as well, the amount of gas supply is increased so that the stoichiometric ratio (gas flow amount) for unit cells that have exhibited the most decreased stoichiometric ratio is at or above the limiting cell stoichiometric ratio (limiting cell flow amount), so as to operate the fuel cell 12 stably. By doing this, it is possible to increase the cell stoichiometric ratio of all unit cells to above the limiting cell stoichiometric ratio, and enable inhibiting of a voltage drop in the fuel cell 12.

FIG. 7A to FIG. 7D are timing diagrams showing the processing performed at startup of the fuel cell system 10. When starting at a low temperature, starting of fuel cell system 10 is done at t0, at which warm-up operation is done. Operation transitions to normal operation at the time t7, and at which the fuel cell 12 is properly started. In this embodiment, during the time from time t0 to time t7, a judgment is made as to whether or not the flow passages 30, 32 of each unit cell have frozen and are blocked by freezing, and processing is done to increase the gas amount if the passages are blocked.

Figure 7:
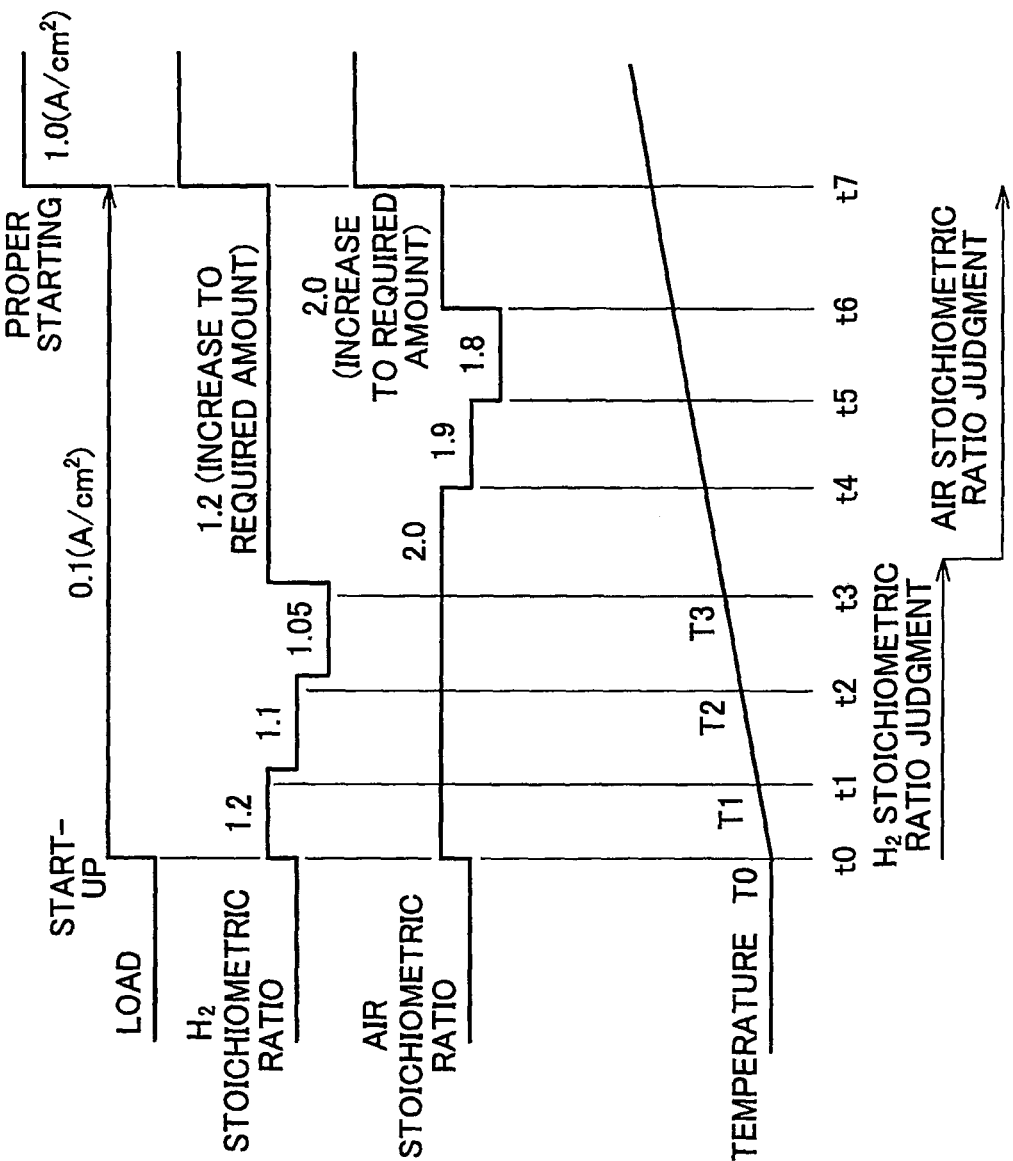
FIGS. 7A to 7D are timing charts showing the processing performed at the time of startup of the fuel cell system.

FIG. 7A shows the load on the fuel cell 12 set after starting. In the example of FIG. 7A, after the startup time t0, the load is set to 0.1 [A/cm²]. After time t7, at which operation transitions to normal operation, the load is set to 1.0 [A/cm²]. In this manner, when judging whether or not the flow passages 30, 32 of the unit cells have been blocked by freezing, the load is made smaller than for normal operation. By doing this, when determining the cell stoichiometric ratio for either the anode gas or the cathode gas, it is possible to avoid a condition in which it is not possible to accurately judge the stoichiometric ratio due to insufficient gas in the other of the anode gas and cathode gas. If the load that is set to be smaller than during normal operation is set excessively low, it becomes difficult to detect the change in voltage. On the other hand, if this load is set excessively high, deterioration occurs in the electrolyte film, catalyst layer, and the like due to the negative voltage that occurs because of insufficient flow amount.

Given this, it is desirable that the load sets to be smaller than at the time of normal operation is approximately 0.05 to 0.1 [A/cm²]. Although in this embodiment, the load on the fuel cell during normal operation is 1.0 [A/cm²], there is no restriction to this value.

FIG. 7B shows the stoichiometric ratio of anode gas in the anode gas flow passage 14. FIG. 7C shows the stoichiometric ratio of the cathode gas in the cathode gas flow passage 16. These stoichiometric ratios are values that are set in accordance with the load on the fuel cell 12, and are ratios of the actual gas flow amount with respect to the theoretical value of gas flow corresponding to the load. In the case of a load of 0.1 [A/cm²], the stoichiometric ratio of the anode gas is set to approximately 1.2, and the stoichiometric ratio of the cathode gas is set to approximately 2.0.

FIG. 7D shows the temperature of the fuel cell 12. As shown in FIG. 7D, when the fuel cell 12 is started at time t0, the temperature of the fuel cell 12 rises after starting due to electrical generation. The correction of the cell voltage based on the temperature of the fuel cell 12 will be described later.

In this embodiment, the anode gas and cathode gas stoichiometric ratios are caused to change between time t0 and t7, and the relationship between the voltage change rate and the stoichiometric ratio is determined by the method described with regard to FIG. 4 and FIG. 5. In the above-described method, the stoichiometric ratio (gas flow amount) for the anode gas and cathode gas in each unit cell is calculated based on the voltage change rate for each unit cell.

For this reason, as shown in FIG. 7B, the stoichiometric ratio of the anode gas is first stepwise lowered from the time t0 to time t3, and the voltage change rate is calculated, processing being performed so as to obtain the characteristics shown in FIG. 4 and FIG. 5. In doing this, the stoichiometric ratio of the cathode gas (in this case 2.0) is held constant. In the example shown in FIG. 7B, the anode gas stoichiometric ratio is changed from 1.2 to 1.1 and then 1.05 in steps. Therefore, by determining the average cell voltages V0, V1 and V2 corresponding to the stoichiometric ratios of 1.2, 1.1, and 1.05, the voltage change rate when the stoichiometric ratio is changed is determined as described by FIG. 4 and FIG. 5. Therefore, based on the voltage change rate of each unit cell, it is possible to calculate the cell stoichiometric ratio (anode gas flow amount) of the anode gas in each unit cell.

When the cell stoichiometric ratios (gas flow amounts) of the anode gas in each unit cell is determined, processing is performed so as to increase the amount of anode gas so that the stoichiometric ratio (gas flow amount) in unit cells exhibiting the most decrease in stoichiometric ratio is caused to be at or above the limiting cell stoichiometric ratio (limiting cell flow amount).

Next, as shown in FIG. 7C, the cathode gas stoichiometric ratio is decreased in stepwise fashion from the time t4 to t6, and processing is performed to calculate the voltage change rate. When doing this, the stoichiometric ratio of the anode gas is held constant (in this case 1.2). In the example of FIG. 7C, the cathode gas stoichiometric ratio is changed from 2.0 to 1.9 and then to 1.8 in stepwise fashion. Therefore, by determining the average cell voltages V0, V1, and V2 corresponding to the stoichiometric ratios 2.0, 1.9, and 1.8, the voltage change rate when the stoichiometric ratio is varied is determined as described in FIG. 4 and FIG. 5. Therefore, based on the voltage change rate of each unit cell, it is possible to calculate the cell stoichiometric ratio (cathode gas flow amount) in each unit cell.

When the cell stoichiometric ratios (gas flow amounts) for cathode gas in each unit cell are determined, processing is performed so as to increase the amount of cathode gas so that the cell stoichiometric ratio (gas flow amount) of unit cells that exhibit the most decrease in stoichiometric ratio are caused to be at or above the limiting stoichiometric ratio (limiting cell flow amount).

By doing this, it is possible to make the stoichiometric ratio of anode gas and cathode gas for all of the unit cells above the limiting stoichiometric ratio, so that it is possible to perform stable operation of the fuel cell 12 even when the flow passages 30, 32 are blocked by freezing.

In this manner, the fuel cell 12 starts at a low temperature and, when time t7 elapses, the fuel cell system 10 performs a proper starting, so as to transition to normal operation. That is, the load on the fuel cell system 10 is set to a value of the load of the fuel cell vehicle or the like that is being driven. In the example of FIGS. 7A to 7D, the load on fuel cell 12 is set to 1.0 [A/cm$^2$].

Even after the time t7, until the freezing in the flow passage is completed cleared, that is, until the warm-up of the fuel cell 12 is completed and the temperature of the fuel cell 12 exceeds the freezing point, because it can be imagined that freezing is hindering the flow of gas, the amount of gas is increased, based on the increase ratio of gas before the time t7. For example, if the stoichiometric ratio of the anode gas is 1.5 times based on the judgment before the time t7, after the time t7 as well control is performed so that the stoichiometric ratio is increased 1.5 times, corresponding to the load of 1.0 [A/cm$^2$] in the same manner. By doing this, even after transitioning to normal operation, it is possible to set the cell stoichiometric ratio of a unit cell in which the flow passage is blocked by freezing to higher than the limiting stoichiometric ratio corresponding to the load of 1.0 [A/cm$^2$], thereby suppressing a decrease in the voltage of the fuel cell 12.

At the time t7 the warm-up of the fuel cell 12 is completed and, after the temperature of the fuel cell 12 exceeds the freezing point, because the water content inside the fuel cell 12 that had been frozen melts, thereby clearing the blockage of the flow passages 30, 32, and the like, the increasing of the amount of the anode gas and the cathode gas is stopped, and the stoichiometric ratio is set to a value responsive to the load. By doing this, it is possible to operate the fuel cell 12 with the minimum amount of gas commensurate with the operation conditions.

The method of this embodiment can determine the stoichiometric ratio (gas flow amount) of the anode gas and the cathode gas of each unit cell when starting at a low temperature. If the cell voltage decreases because of flow passage blockage caused by freezing, because this embodiment increases the stoichiometric ratio (gas flow amount) with the unit cell voltage of a cell the voltage of which has decreased as a reference, it is possible to operate the fuel cell 12 stably even when starting at a low temperature. This enables quick completion of the warm-up of the fuel cell 12, and quick transition to normal operation.

Because the judgment of whether or not the flow passages 30, 32 are blocked is performed in the condition in which the load on the fuel cell 12 is reduced before transitioning to normal operation, it is possible to reliably suppress film deterioration due to the negative voltage even if insufficient supply of gas occurs in only some cells. It is preferable that the load at the time of the judgment be set to below the value at which a negative voltage occurs within the fuel cell 12.

When determining the gas flow amount in each unit cell, because the anode gas flow amount is determined first, if there is a serious insufficiency of supply of anode gas due to freezing, by taking appropriate measures, such as stopping the warm-up or performing warm-up by an external heat source, it is possible to suppress film deterioration, such as of the electrolyte film cause by the generation of a negative voltage. Also, because an insufficiency in anode gas supply occurs when there is a large degree of flow path blockage, by first calculating the stoichiometric ratio of the anode gas and increasing the amount of flow of the anode gas, it is possible to warm up the anode gas flow passages first, which have been blocked, thereby enabling a shortening of the warm-up time.

Temperature correction of the voltage value will now be described. As shown in FIG. 7D, in the process of judging the flow passages that are blocked during the time from time t0 to time t7, the temperature of the fuel cell 12 increases with electrical generation by the fuel cell 12. When the temperature of the fuel cell 12 rises, because the cell voltage rises, when judging whether or not blockage of the flow passage has occurred due to freezing, based on the rate of voltage change, the voltage change can be thought of as including factors related to the temperature rise. For this reason, when determining the cell stoichiometric ratio of each unit cell, this embodiment corrects the voltage values by considering the amount of rise in temperature.

Figure 8:
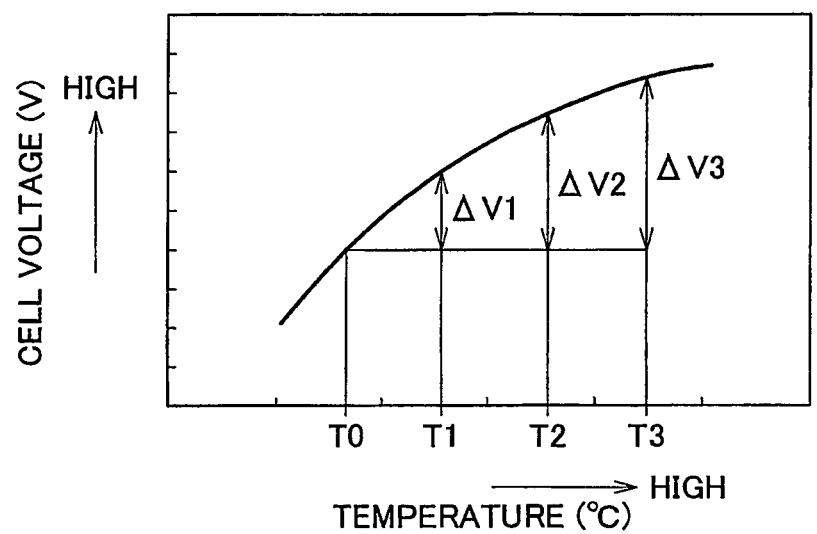
FIG. 8 is a graph showing characteristics indicating the relationship between the temperature of a fuel cell and the cell voltage.

FIG. 8 is a drawing showing characteristics indicating the relationship between the temperature of the fuel cell 12 and the cell voltage. This embodiment performs processing to correct the rate of voltage change based on the characteristics shown in FIG. 8.

As described above, when determining the rate of voltage change, the average cell voltage is determined each time the stoichiometric ratio is decreased. In the examples shown in FIGS. 7A to 7D, the average cell voltage V0 corresponding to the stoichiometric ratio of 1.2 at time t1, the average cell voltage V1 corresponding to the stoichiometric ratio of 1.1 at time t2, and the average cell voltage V2 corresponding to the stoichiometric ratio of 1.05 at time t3 are determined.

As shown in FIG. 7D, the temperature of the fuel cell 12 also changes with the elapse of time. For this reason, the cell voltage V0 is corrected based on the temperature T1 at the time t1. In the same manner, the cell voltage V1 is corrected based on the temperature T2 at the time t2, and the cell voltage V2 is corrected based on the temperature T3 at the time t3.

Specifically, as shown in FIG. 8, the voltage change amount ΔV1 when the temperature changes from T0 to T1 is determined, and V0 is corrected by subtracting ΔV1 from the average cell voltage V0. In the same manner for average cell voltages V2 and V3, the average cell voltages V1 and V2 are corrected by subtracting the average cell voltage ΔV2 when the temperature changes from T0 to T2 and the average cell voltage ΔV3 when the temperature changes from T0 to T3, respectively, from the average cell voltages V1 and V2. After correction, therefore, the corrected average cell voltages $V0_{corrected}$, $V1_{corrected}$, and $V2_{corrected}$ can be expressed by the following equations.

$$V0_{corrected} = V0 - \Delta V1$$

$$V1_{corrected} = V0 - \Delta V2$$

$$V2_{corrected} = V0 - \Delta V3$$

By doing the above, it is possible to determine the characteristics shown in FIG. 4 and FIG. 5 based on the corrected average cell voltages $V0_{corrected}$, $V1_{corrected}$, and $V2_{corrected}$. When determining the rate of voltage change for each unit cell as well, the voltage values are corrected based on the temperature when the cell voltage is detected, using the same type of method. By doing this, it is possible to calculate the cell stoichiometric ratio in each unit cell with high accuracy after eliminating the influence of temperature on the voltage, making it possible to accurately distinguish unit cells in which blockage of the flow passages 30, 32 has occurred due to freezing. It is therefore possible to perform optimal and accurate control of the increased gas amount when starting at a low temperature, and it is possible not only to suppress a reduction in fuel economy by excessive gas flow, but also to reliably suppress insufficient gas supply.

The temperature of the fuel cell 12 can be acquired from the exit temperature of the coolant circulating within the fuel cell 12 (the temperature at the location at which coolant is discharged from the fuel cell). The temperature of the fuel cell 12 may alternatively be calculated based on the reaction amount (generated energy) in the fuel cell 12 from the time of starting and the amount of electricity generated. The reaction amount within the fuel cell 12 can be calculated based on the amount of anode gas supply (amount of hydrogen supplied) from the time of starting to the time of acquisition of the temperature. The amount of electricity generated is the electrical energy that is generated by the fuel cell 12 from the time of starting to the time of acquisition of the temperature. Of the reaction amount within the fuel cell 12, because energy consumed other than generated electricity is heat that is generated, it is possible to determine the amount of heat generated by subtracting the amount of electricity generated from the reaction amount, and it is possible to determine the amount of temperature rise of the fuel cell 12 from the amount of heat generated and the heat capacity (known) of the fuel cell 12. By doing this, it is possible to determine the temperature of the fuel cell 12 from the initial temperature and the amount of temperature rise.

Figure 9A:
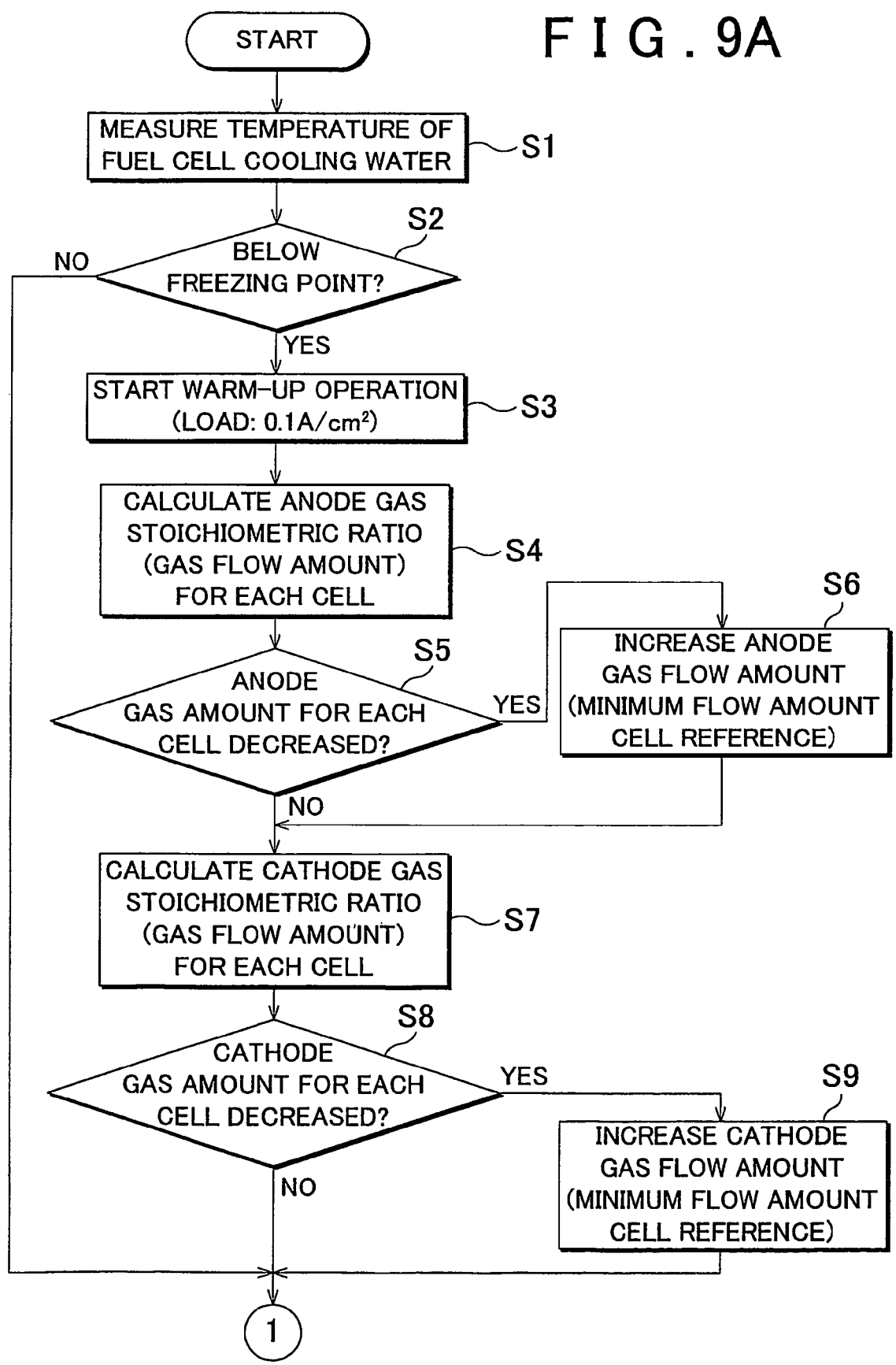
FIGS. 9A and 9B are flowcharts showing the procedure for processing in the fuel cell system.
Figure 9B:
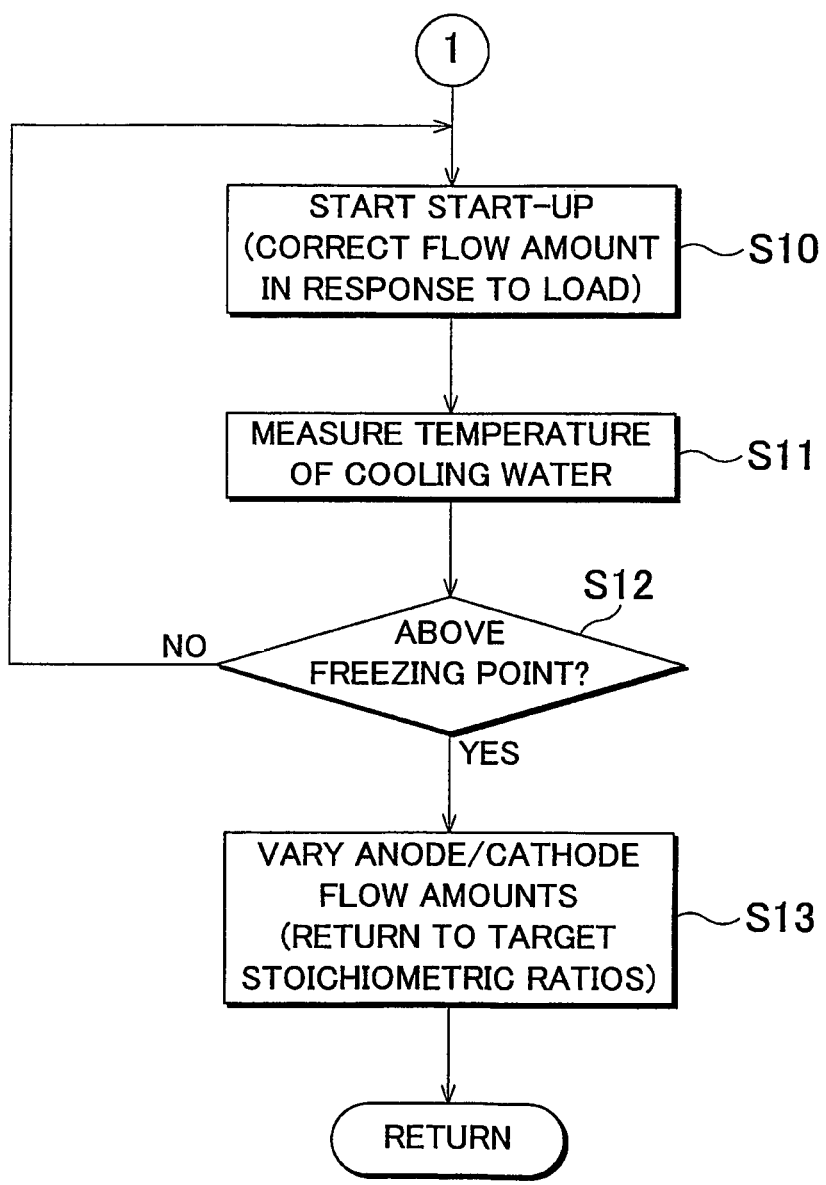

The processing procedure in the fuel cell system 10 according to this embodiment is described below based on the flowchart of FIGS. 9A and 9B. The processing in FIGS. 9A and 9B are performed when the fuel cell 12 is started. First, at step S1, the cooling water temperature of the fuel cell 12 is measured. Next, at step S2, a judgment is made as to whether or not the cooling water temperature is below the freezing point.

If the temperature of the cooling water is below the freezing point at step S2, processing proceeds to step S3, at which warm-up operation of the fuel cell 12 is started. In this case, as described with regard to FIGS. 7A to 7D, the load on the fuel cell 12 is set to 0.1 [A/cm$^2$]. If, however, the temperature of the cooling water is not below the freezing point at step S2, processing proceeds to step S10.

After step S3, processing proceeds to step S4, at which the cell stoichiometric ratio (gas flow amount) of anode gas in each unit cell is determined. At this point, the stoichiometric ratio of the anode gas is caused to vary by the above-described method, and the cell stoichiometric ratio of each unit cell is determined based on the rate of voltage change.

Next, at step S5, a judgment is made as to whether or not the cell stoichiometric ratio (gas flow amount) of the anode gas has decreased at each unit cell. If a unit cell exists in which the cell stoichiometric ratio is below the limiting cell stoichiometric ratio, processing proceeds to step S6. If there is no unit cell in which the cell stoichiometric ratio is below the limiting cell stoichiometric ratio, processing proceeds to step S7.

At step S6, processing is performed to increase the amount of anode gas flow. At this point, the amount of anode gas flow is increased so that the cell stoichiometric ratio of the unit cell in which the cell stoichiometric ratio (flow amount) has decreased is raised to above the limiting cell stoichiometric ratio (limiting cell flow amount). After step S6, processing proceeds to step S7.

At step S7, the cell stoichiometric ratio (gas flow amount) of the cathode gas in each unit cell is determined. At this point, the cell stoichiometric ratio of the cathode gas is caused to vary by the above-noted method and the cell stoichiometric ratio of each unit cell is determined based on the rate of voltage change.

Next, at step S8, a judgment is made as to whether or not the cell stoichiometric ratio (gas flow amount) of the cathode gas has decreased in each unit cell. If a unit cell exists in which the cell stoichiometric ratio is below the limiting cell stoichiometric ratio, processing proceeds to step S9. If there is no unit cell in which the cell stoichiometric ratio is below the limiting cell stoichiometric ratio, processing proceeds to step S10.

At step S9, processing is performed to increase the flow of cathode gas. At this point, the amount of cathode gas flow is increased so that the cell stoichiometric ratio of the unit cell in which the cell stoichiometric ratio (flow amount) has decreased is raised to above the limiting cell stoichiometric ratio (limiting cell flow amount). After step S9, processing proceeds to step S10.

At step S10, the fuel cell 12 is properly started, and transition is made to normal operation. At this point, the load on the fuel cell 12 is set, for example, to 1.0 [A/cm$^2$]. When doing this, if the anode gas and cathode gas flow amounts are increased at steps S6 and S7, the gas amount is increased also after transition to normal operation by the same amount.

Next, as step S11, the cooling water temperature of the fuel cell 12 is measured. Next, at step S12, a judgment is made as to whether or not the cooling water temperature is above the freezing point. If the cooling water temperature is above the freezing point at step S12, processing proceeds to step S13. If the cooling water temperature is below the freezing point at step S12, return is made to step S11.

If processing proceeds to step S13, because the warm-up of the fuel cell 12 is completed and it can be assumed that the blockage of the flow passages 30, 32 by freezing has been cleared, in the case of increasing the anode gas and cathode gas flow amounts at step S6 and step S9, control of the stoichiometric ratio of the anode gas and the cathode gas is performed so as to be the target stoichiometric ratios for normal operation. Processing ends (RETURN) after step S13.

According to the above-described embodiment, it is possible to determine with high accuracy the stoichiometric ratios (gas flow amounts) of the anode gas and the cathode gas of each unit cell when starting. In the case in which a cell voltage decreases between of flow passage blockage due to freezing, by increasing the supply of gas based on the cell voltage of the unit cell with the decreased cell voltage, it is possible to stably operate the fuel cell 12 even when starting at a low temperature. By doing this, it is possible to perform warm-up of the fuel cell 12 in a short period of time, and possible to suppress deterioration of the fuel cell 12 due to insufficient supply of gas.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the appended claims.

The invention claimed is:

1. A cell stoichiometric ratio calculation apparatus for a fuel cell system comprising:
    means for acquiring a cell voltage of a unit cell of a fuel cell that is supplied with a prescribed gas to generate electronic power;

means for calculating the average cell voltage by averaging the cell voltages of each unit cell;

means for varying the stoichiometric ratio of the prescribed gas that is supplied to the fuel cell when a setting value for the stoichiometric ratio is varied from a reference value to another value;

means for acquiring an approximating equation representing a relationship between the stoichiometric ratio and the rate of change of the average cell voltage when the setting value for the stoichiometric ratio is varied from the reference value to the another value; and means for calculating the rate of change of the cell voltage of each unit cell when the setting value for the stoichiometric ratio is varied from the reference value to a prescribed value, wherein the cell stoichiometric ratio calculation apparatus is programmed to calculate the cell stoichiometric ratio for each unit cell based on the rate of change of the cell voltage, using the approximating equation.

2. The cell stoichiometric ratio calculation apparatus according to claim 1, further comprising:

means for acquiring an internal temperature of the fuel cell, and means for correcting the cell voltage based on the internal temperature.

3. The cell stoichiometric ratio calculation apparatus according to claim 1, further comprising:

means for setting a load of the fuel cell that is smaller than the load at the time of normal operation.

4. The cell stoichiometric ratio calculation apparatus according to claim 1, further comprising:

first means for calculating a cell stoichiometric ratio of the first gas of the prescribed gas that includes hydrogen, for each unit cell; and second means for calculating a cell stoichiometric ratio of the second gas of the prescribed gas that includes oxygen, for each unit cell.

5. A cell stoichiometric ratio calculation apparatus for a fuel cell system comprising:

a control unit programmed to:

acquire a cell voltage of a unit cell of a fuel cell that is supplied with a prescribed gas to generate electronic power;

calculate the average cell voltage by averaging the cell voltages of each unit cell;

vary the stoichiometric ratio of the prescribed gas that is supplied to the fuel cell when a setting value for the stoichiometric ratio is varied from a reference value to another value;

acquire an approximating equation representing a relationship between the stoichiometric ratio and the rate of change of the average cell voltage when the setting value for the stoichiometric ratio is varied from the reference value to the another value; and calculate the rate of change of the cell voltage of each unit cell when the setting value for the stoichiometric ratio is varied from the reference value to a prescribed value, wherein the control unit is programmed to calculate the cell stoichiometric ratio for each unit cell based on the rate of change of the cell voltage, using the approximating equation.

6. The fuel cell system according to claim 1, further comprising internal temperature acquirement means for acquiring an internal temperature of the fuel cell; and means for correcting the cell voltage based on the internal temperature.

7. The fuel cell system according to claim 5, wherein the control unit is programmed to acquire an internal temperature of the fuel cell, and correct the cell voltage based on the internal temperature.

* * * * *